United States Patent Office 2,932,605
Patented Apr. 12, 1960

2,932,605

COCCIDIOSIS TREATMENT WITH 4-BROMO-4'-NITRO-CARBANILIDE

Walter Hepworth, Manchester, England, assignor to Imperial Chemical Industries Limited, London, England, a corporation of Great Britain No Drawing. Application December 17, 1956
Serial No. 628,480

Claims priority, application Great Britain January 4, 1956

5 Claims. (Cl. 167—53.1)

This invention relates to an improved process of manufacture and more particularly it relates to an improved process for the manufacture of 4-bromo-4'-nitrocarbanilide and new veterinary compositions thereof which are useful against coccidiosis in the domestic fowl.

It is known to prepare 4-bromo-4'-nitrocarbanilide by interaction of p-bromobenzazide and p-nitroaniline.

According to the invention we provide an improved process for the manufacture of 4-bromo-4'-nitrocarbanilide which comprises either bromination of 4-nitrocarbanilide or interaction of p-bromophenyl urea and p-nitroaniline.

The said bromination may be carried out by the use of bromine in the presence of an inert diluent or solvent for example acetic acid and the process may be carried out at temperatures within a wide range for example the process may be carried out at the ordinary temperature of about 15–25° C. or at an elevated temperature of about 90–95° C.

The said interaction may take place in the presence of an inert diluent or solvent for example o-dichlorobenzene or acetic acid.

As stated above 4-bromo-4'-nitrocarbanilide is useful against coccidiosis in the domestic fowl. We have observed for example that when food containing 0.02% of its weight of 4-bromo-4'-nitrocarbanilide, is fed to chicks, it provides protection against infections caused by Eimeria tenella, and thus the compound may be expected to be of value in the treatment and/or prophylaxis of coccidiosis.

According to a further feature of the invention therefore we provide new veterinary compositions wherein the active ingredient is 4-bromo-4'-nitrocarbanilide in admixture with a suitable diluent or carrier.

The concentration of the 4-bromo-4'-nitrocarbanilide in the said compositions may vary over a wide range being dependent upon the form in which such compositions are to be used for example as foodstuff, in drinking water or as admixtures with foodstuff. The said compositions are conveniently produced by intimately dispersing or distributing the active ingredient throughout a carrier or diluent which may be either solid or liquid. Liquid dispersions can be prepared satisfactorily by using emulsifying and/or surface active agents. Any suitable carrier or diluent which is inert towards the active ingredient can be used provided that it can be administered to animals with safety.

The said new veterinary compositions may be in the form of a food composition which may be a commercial starting, laying or growing mash comprising for example edible vegetable material such as a commercial animal or poultry feed, urea, corn meal, fermentation residues and distillers' dried grains and containing the active ingredient in any desired amount suitable for the treatment of coccidiosis. This food composition may be prepared by distributing the active ingredient by known means such as stirring, tumbling and grinding in the food which may be employed as a sole or part feeding ration. In this way, by selecting different carriers and by altering the ratio of carrier to active ingredient, compositions of varying concentration may be prepared. If desired, the active ingredient may be dissolved in a suitable organic solvent for example acetone and the solution so obtained may then be distributed in the food and the solvent removed by any means known to the art.

Compositions suitable for addition to poultry feed may contain from about 1% by weight to about 50% by weight of the active ingredient and preferably about 5–20% by weight of the active ingredient absorbed on or mixed with the carrier or diluent. The amount of active ingredient required for effective prophylactic control of coccidiosis is very low. With regard to poultry, there may be administered a quantity of the active ingredient equal to about 0.005% by weight to about 0.05% by weight of the food consumed or preferably a daily administration of a quantity of active ingredient equal to about 0.01% by weight to about 0.03% by weight of the food consumed. Such relatively small amounts may be conveniently incorporated in the normal ration prior to feeding the poultry. Larger concentrations of up to about 0.1% of the active ingredient may be employed if an outbreak of the disease is encountered.

The said new veterinary compositions may as indicated above be in the form of powders suitable for admixture to feeding stuffs. The said powders may contain the active ingredient in admixture with solid, non-toxic diluents or carriers for example talc, kaolin, chalk, lactose or urea. Such powders may contain additional ingredients such as dispersing and/or wetting agents for example the condensation product of cetanol and ethylene oxide or a thickening agent for example methylcellulose.

The said new veterinary compositions may also be in the form of capsules or tablets in which the active ingredient is incorporated together with non-toxic excipients known to be suitable for the provision of capsules or tablets.

The said new veterinary compositions may also be in the form of aqueous dispersions in which the active ingredient is admixed in aqueous media with non-toxic excipients suitable for the provision of stable aqueous dispersions. Further additional excipients which may be present include for example sweetening agents for example lactose and solubilising agents for example propylene glycol. Thus the said active ingredient may be dissolved in propylene glycol containing a suitable dispersing agent such as polyoxyethylene sorbitan monooleate and the solution so obtained may be added to water to provide an aqueous dispersion suitable for use as drinking water by fowls in the treatment of coccidiosis.

The said new veterinary compositions may be in the form of dispersible powders in which the active ingredient is incorporated together with one or more non-toxic wetting and/or dispersing agents for example the condensation product of beta-naphthalene sulphonic acid and formaldehyde. Such dispersible powders may be added directly to feeding stuffs or they may be mixed with water to provide stable dispersions which may be added to drinking water or to suitable feeding stuffs.

The invention is illustrated but not limited by the following examples in which the parts are by weight:

*Example 1*

5.5 parts of bromine are added to a mixture of 8.2 parts of p-nitrocarbanilide and 160 parts of glacial acetic acid maintained at a temperature of 15–25° C. The reaction mixture is then stirred during 30 minutes and is then filtered. The solid residue is washed with acetic acid and methanol and there is thus obtained 4-bromo- 4'-nitrocarbanilide as a yellow crystalline solid, M.P. 280° C. with decomposition.

Example 2

1.1 parts of p-bromophenylurea and 0.7 part of p-nitroaniline are dissolved in 10 parts of o-dichlorobenzene, and the solution is heated under reflux until no more ammonia is liberated (about 6–7 hours). The reaction mixture is cooled and filtered and the solid residue is washed with benzene. The washed solid residue so obtained consists of 4-bromo-4'-nitrocarbanilide, M.P. 280° C. with decomposition.

Example 3

5.5 parts of bromine are added to a mixture of 8.2 parts of p-nitrocarbanilide and 80 parts of glacial acetic acid at a temperature of 90–95° C. The reaction mixture is then cooled and filtered. The solid residue is washed with acetic acid and methanol and there is thus obtained 4-bromo-4'-nitrocarbanilide as a yellow crystalline solid, M.P. 280° C. with decomposition.

Example 4

19,800 parts of chicken food mash are wetted with a solution of 4 parts of 4-bromo-4'-nitrocarbanilide in 16,500 parts of acetone and the mixture is stirred mechanically for two hours. It is then dried at 50° C. and there is thus obtained a chicken food mash suitable for the treatment of coccidiosis.

Example 5

2 parts of 4-bromo-4'-nitrocarbanilide are dissolved in a mixture of 120 parts of polyoxyethylene sorbitan monooleate and 4 parts of propylene glycol, and there is thus obtained a solution, which on dilution with drinking water provides a stable dispersion of 4-bromo-4'-nitrocarbanilide suitable for the treatment of coccidiosis.

Example 6

10 parts of 4-bromo-4'-nitrocarbanilide and 30 parts of limestone flour are ground together to give a mixture which is then mixed with suitable foodstuff to provide material suitable for the treatment of coccidiosis.

Example 7

A mixture of 1 part of 4-bromo-4'-nitrocarbanilide and 0.0375 part of condensation product of cetanol and ethylene oxide is dissolved in 55 parts of acetone and 15 parts of methylcellulose are added thereto. The mixture is dried. It is then thoroughly mixed with 30 parts of urea and there is thus obtained a dispersible powder suitable for use in the treatment of coccidiosis.

Example 8

1 part of 4-bromo-4'-nitrocarbanilide and 1 part of the condensation product of beta-naphthalene sulphonic acid and formaldehyde are ground together and there is thus obtained a mixture which may be added either to suitable foodstuffs or to drinking water and the products so obtained are suitable for the treatment of coccidiosis.

What I claim is:

1. A composition useful against coccidiosis comprising an animal feedstuff containing 4-bromo-4'-nitrocarbanilide.

2. A composition according to claim 1 including from 0.005% to 0.05% by weight of said 4-bromo-4'-nitrocarbanilide, based on the weight of said feedstuff.

3. A composition according to claim 1 including from 0.01% to 0.03% by weight of said 4-bromo-4'-nitrocarbanilide, based on the weight of said feedstuff.

4. The method of treating coccidiosis in domestic fowl which comprises feeding the fowl a composition comprising 4-bromo-4'-nitrocarbanilide, as the active ingredient, in admixture with a carrier adapted for oral ingestion.

5. The method of treating coccidiosis in domestic fowl which comprises orally administering 4-bromo-4'-nitrocarbanilide to the fowl.

References Cited in the file of this patent

UNITED STATES PATENTS

| | | |
|---|---|---|
| 2,731,382 | Basso | Jan. 17, 1953 |
| 2,731,385 | O'Neill | Jan. 17, 1953 |
| 2,745,874 | Schetty | May 15, 1956 |
| 2,764,478 | Searle | Sept. 25, 1956 |
| 2,787,574 | O'Neill | Apr. 2, 1957 |

OTHER REFERENCES

Chemical Abst., Subject Index, vol. 31, 1937, p. 9641.